INVENTOR.
KENNETH C. HEFLIN
BY
Horton, Davis, Brewer & Brugman
ATTORNEYS

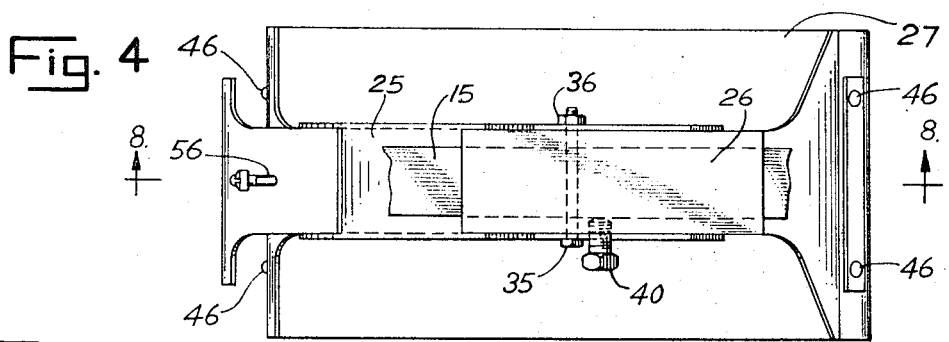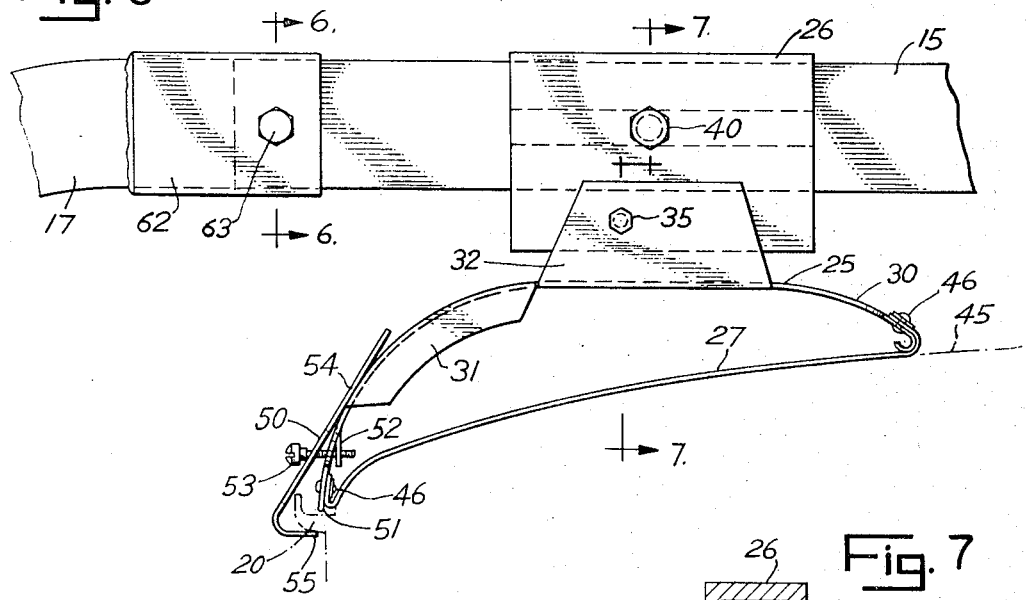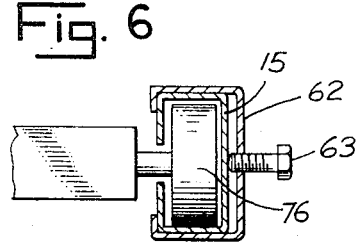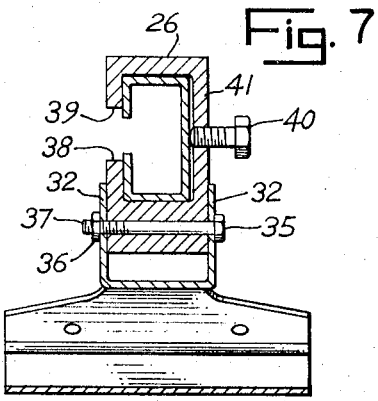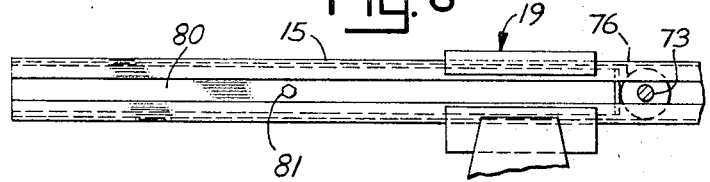

United States Patent Office 3,452,893
Patented July 1, 1969

3,452,893
CARGO CARRYING AND LOADING APPARATUS
FOR USE ON A VEHICLE ROOF
Kenneth C. Heflin, R.R. 3, Columbia City, Ind. 46725
Filed Sept. 15, 1967, Ser. No. 667,925
Int. Cl. B60r 9/00
U.S. Cl. 214—450                            10 Claims

ABSTRACT OF THE DISCLOSURE

A vehicle roof top cargo carrying and loading apparatus having a pair of parallel spaced roof tracks, a pair of companion removable extension loading tracks, and a cargo dolly arranged for rollered movement along the roof and loading tracks between positions away from the vehicle and a carrying position generally centrally of the roof tracks. The roof tracks are supported by brackets, each of which has a bowedly strung strap arranged to conformedly engage the upper surface of the roof in a manner to distribute the respective load thereon with substantially uniform pressure over the entire outer area of the strap.

BACKGROUND OF THE INVENTION

Field of the invention

This invention pertains to the vehicle top carrier art and is particularly directed to carrier apparatus in which the cargo is carried on a rollered dolly which is guidedly engaged in and movable along a track system comprising a roof track and a removable inclined loading track, the roof track being supported from the vehicle roof by mounting brackets arranged to distribute the cargo load uniformly over an extended area of the roof.

Description of the prior art

Vehicle top carriers constructed in accordance with the prior art, and which include means for loading and unloading the carrier, disclose problems which render them unwieldy and awkward to use. For example, the carrier disclosed in the United States Patent No. 3,215,295, issued on November 2, 1965, to Fred B. Schuyler utilizes a cargo bearing platform, and an associated track system which includes only a pair of roof tracks. The platform is provided with a pair of rollers at the trailing end thereof and a second pair of rollers generally amidships thereof, and is arranged for loading and unloading movement along the roof tracks by lifting the unrollered leading end of the platform from its position against the roof track, rolling the platform over the edge of the roof track in the manner of a wheelbarrow to an overhanging position with respect to the roof tracks and then lowering the leading edge to the ground adjacent the vehicle where the platform rests in a steeply tilted position. It will be observed that the platform of Schuyler must have a greater lateral extent than the distance between the roof track and the ground in order to assume its tilted loading and unloading position, and that during the loading and unloading movement of the platform away from the roof track that the load on the platform outwardly of the roof tracks creates an unbalanced condition which requires a substantial restraining force to raise and lower the platform between its tilted and horizontal positions.

The United States patent to A. Roux, No. 3,186,569, issued June 1, 1965, discloses apparatus similar to that of Schuyler. The cargo bearing platform of Roux provided with a roller at the trailing end thereof only and, like Schuyler is dropped to a loading position by lifting the leading end of the platform from a roof track, rolling the platform along the roof track to a position away from the vehicle where the leading end is then lowered to the ground, where the platform assumes an inclined position with its upper portion resting against the roof tracks.

Another related United States patent is No. 2,849,135, issued on Aug. 26, 1958, to J. D. Embler. Embler discloses a track system comprising a pair of roof tracks and a pair of extension loading tracks. Associated rollers arranged for attachment directly to the cargo are provided by Embler moving the cargo between loading and unloading positions along the track system. The rollered cargo in Embler is secured in a carrying position above the roof of the vehicle by tie-down cables interconnecting the rollers and the roof tracks. Among other difficulties encountered with the Embler apparatus is the requirement that the rollers must be attached to the cargo directly, and at appropriate positions not only to balance the cargo load but also to conform to the track spacing as well.

A related problem, unsolved in the prior art, concerns the mounting brackets which are used to support cargo carrying apparatus on the roof of a vehicle. It is understandably desirable to avoid concentrations of the load against the underlying and supportive roof of the vehicle to avoid denting the roof or marring the surface thereof. This is especially true when the carrying apparatus is used to transport heavy cargo, such as boats, luggage and the like. The mounting brackets of the prior art fall generally into two classes, the brackets of the first class utilizing and deriving all or a substantial part of their load bearing capability from the rain gutters of the underlying vehicle. The United States Patent No. 2,728,502, issued on Dec. 27, 1965, to Victor D. Plantico is typical of the first class of mounting brackets. The second class of mounting brackets, to which my present invertion pertains, bears directly against and are borne substantially by the roof structures of the vehicle. The mounting brackets of this class of the prior art provide a roof engaging element which is formed of a resilient rubber-like material in an attempt to distribute the load over a substantial area of the roof of the vehicle. This second class of mounting brackets is typified by the United States Patents No. 2,551,351, issued on May 31, 1951, to E. C. Swanson, and No. 3,109,569, issued on Nov. 5, 1963, to T. G. Hare. An examination of these typical patents discloses two problems, the first of which is that it is impossible to so contour the surface engaging portion of the resilient element that it will conform to the roof surface of a reasonable range of differently contoured vehicle roofs. The second problem encountered in the prior art is that the fastening means interconnecting the portion of the bracket receiving the load from the carrier structure and the resilient element has a load transmitting area substantially less than the area of the roof engaging surface of the resilient element. The first problem, i.e., non-forming contour of the vehicle roof and the roof engaging surface of the resilient element, results in a non-uniform pressure over the area of the roof engaging surface and against the vehicle roof in the first instance, and the second problem produces a pressure against the vehicle roof which is substantially greater in the area of the fastening means than at the surrounding area of the roof engaging surface of the resilient element when the carrier is loaded. It will thus be appreciated the problem of providing a mounting bracket in which the load imposed thereon is distributed uniformly over the entire area of a conforming roof engaging element remains unsolved.

My present invention overcomes the problems and difficulties enumerated above by providing a simply constructed and easily operated vehicle top cargo carrying and loading apparatus utilizing a cargo carrying dolly arranged for independent rollered movement in guiding and supporting roof tracks and associated inclined extension tracks and between a loading position at the ground adjacent the vehicle and a transport position atop the roof of the vehicle, the dolly being secured for transport by removable blocks positively positioned against the outer peripheries of the wheels of the dolly. As thus arranged, the cargo is attached and removed from the dolly at a convenient ground position and the dolly is raised or lowered by merely pushing or resting the loaded rollable dolly along the inclined and horizontal track system. It will be appreciated that by maintaining a rollered and continuously guided relationship between the cargo dolly and the track system that it is unnecessary to lift any part of the dolly or its cargo and that the cargo dolly is securely held in its transport position by fastening blocks to the tracks and bearingly against the outermost peripheries of the wheels. It is also a part of my present invention to provide novel brackets for mounting the apparatus on the roof of the vehicle and which overcome the problems enumerated above in the brackets of the prior art. The bracket constructed in accordance with my present invention utilizes a bowedly strung strap arranged to conformedly engage the upper surface of the vehicle roof. The strap is mounted by a bowed springable member which operates to commensurately increase and decrease the tension in the strap as the load on the bracket is respectively increased and decreased, and thereby the resultant increased and decreased pressure against the roof over the entire area of the strap remains uniform regardless of the load.

SUMMARY OF THE INVENTION

My present invention contemplates a novel cargo carrying and loading apparatus for use with a vehicle and which utilizes a wheeled dolly to receive and mount the cargo to be carried, the wheels of the dolly being rollably engaged in a supporting track system which constrains the wheels from movement in directions other than therealong. The track system includes a pair of parallel spaced roof tracks mounted on the top by brackets arranged to uniformly distribute their respective loads over an extended area of the vehicle roof, and a pair of companion inclined leading tracks. The dolly is movable rollably along the track system between a loading position at ground level adjacent the car and a position for transit atop the vehicle in the roof tracks, and is securely maintained in its position for transit by conforming blocks inserted in the outer ends of the roof tracks and which positively bear against the adjacent wheels of the dolly.

It is therefore an object of my present invention to provide cargo carrying and associated loading apparatus for use on the roof of a vehicle, which apparatus utilizes a dolly for bearing the cargo and which is easily rolled between a carrying position atop the vehicle and a loading and unloading position at the ground adjacent the vehicle.

It is another object of my present invention to provide cargo carrying and associated loading apparatus for use on the roof of a vehicle in which the cargo is carried on a dolly, the wheels of which are guidedly engaged in a constraining track system and which is securely held in a transit position by merely blocking the wheels from movement along the track.

Yet another object of my present invention is to provide a mounting bracket for use with a vehicle top cargo carrier, which bracket utilizes a flexible strap arranged for conforming engagement with the roof of the vehicle and which is bowedly strung on a load receiving member which operates to commensurately increase and decrease the tension in the strap as the load on the bracket is respectively increased and decreased, the ratable varying of the tension in the strap operating to maintain a uniform pressure over the area of the strap and against the roof of the vehicle.

The foregoing and other benefits and advantages of my present invention will be readily appreciated from the present preferred embodiment thereof which is hereinafter described and illustrated in the acompanying drawings of which:

FIG. 4 is an enlarged plan view of one of the roof mounting brackets of FIG. 2 with the associated crossrail shown fragmented;

FIG. 5 is an elevational view of the roof mounting bracket shown at FIG. 4 shown with a fragmented portion of the associated cross-rail including the loading rail coupler;

FIG. 6 is a sectional view of the bracket of FIG. 5 taken along the lines 6—6 and looking in the direction of the arrows thereon;

FIG. 7 is a sectional view of the bracket of FIG. 5 taken along the lines 7—7 and looking in the direction of the arrows thereon, and FIG. 8 is an enlarged partial sectional view of the bracket of FIG. 2 taken along the lines 8—8 and looking in the direction of the arrows thereon, and showing the end portion of the roof track with the associated wheel block engaged therein.

Figure 1:
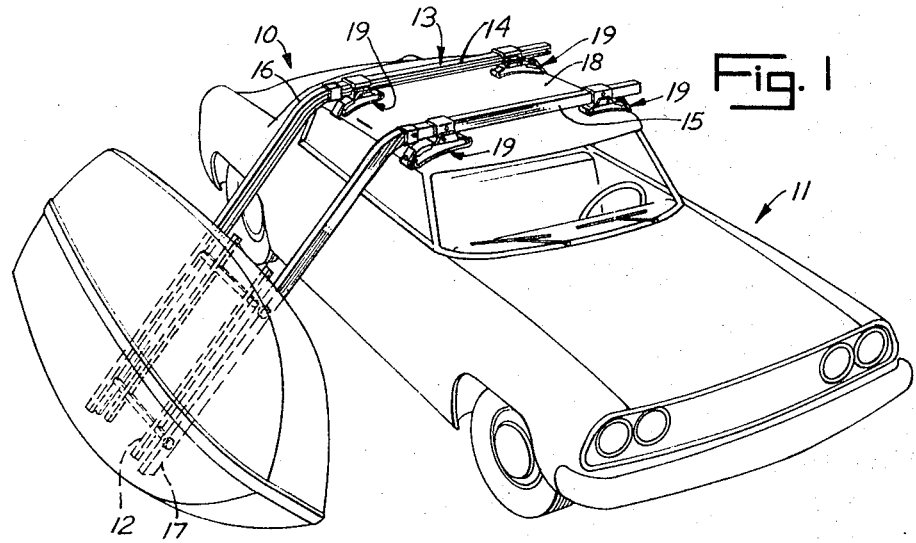
FIGURE 1 is a pictorial view of the cargo carrying and loading apparatus of my present invention shown in use with a conventional automobile.
Figure 2:
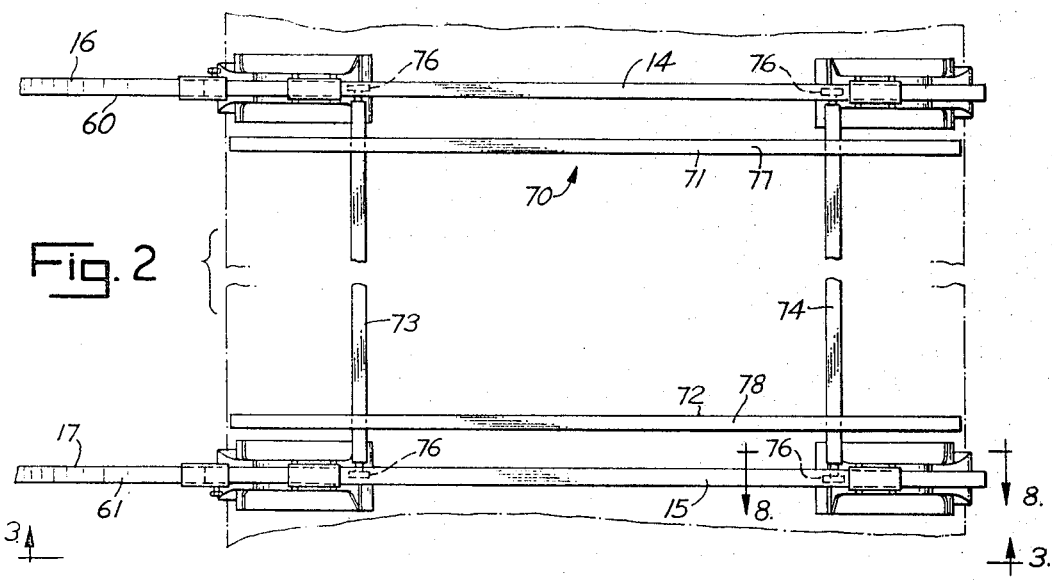
FIG. 2 is a partial plan view of the apparatus of FIG. 1 showing the automobile roof in phantom.

In the above described drawings, the vehicle top carrying and loading apparatus of my present invention, indicated generally by the numeral 10, is illustrated for use with a conventional automobile 11 which is typical of the class of vehicles having supportive roof structures and with which the apparatus of my present invention is adapted for use. Referring first to the pictorial view of FIG. 1, it will be observed that the carrying and loading apparatus 10 includes a dolly 12 arranged for rollered movement along a track system 13 comprising a pair of parallel spaced roof tracks 14 and 15 and a companion pair of inclined extension tracks 16 and 17, the roof tracks 14 and 15 being supported above the roof 18 of the automobile 11 by pairs of like brackets 19.

The roof tracks 14 and 15 are elongated members having a like C-shaped cross-sectional configuration and are formed of a structural material such as, for example, mild steel, aluminum or one of the emerging family of structurally suitable plastics. The roof tracks 14 and 15 are arranged in parallel spaced positions laterally of the automobile 11 and with the open portions of their C cross-sections in a facing relationship. Preferably, the roof tracks 14 and 15 extend laterally across the roof 18 between the opposite rain gutters 20 and 21 thereof to minimize the length of the curvilinear portion of the extension tracks 16 and 17 necessary to assure clearance between the underside of the dolly 12 and the edges of the roof 13 as the dolly 12 is rolled thereacross, and without protruding laterally outwardly beyond the protecting side boundaries of the automobile 11. However, it will be readily appreciated that due to the varying widths of the vehicles with which my present invention is adapted for use, that it is necessary to construct the roof tracks 14 and 16 of a length commensurate with a vehicle of average width and yet which will accommodate vehicles of different widths as well.

Figure 3:
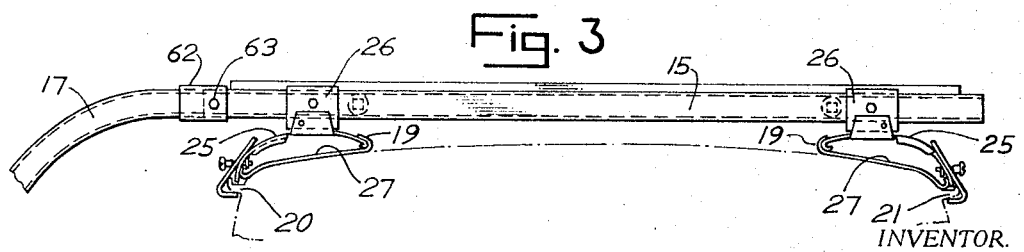
FIG. 3 is a partial elevational view of the apparatus of FIG. 2 taken along the lines 3—3 thereof and looking in the direction of the arrows thereon.

As illustrated at FIG. 3, each of the roof tracks 14 and 15 is supported above the roof 18 of the automobile 11 by a pair of the brackets 19. The structural arrangement of the brackets 19 is best understood by reference to FIGURES 4 and 5. As shown at FIG. 5, each bracket 19 includes an arcuately shaped member 25 which mounts a track clamping member 26 thereabove, and to which a strap member 27 is bowedly strung. The arcuate member 25 is formed of a spring steel material and is arranged for limited flexing action when loads are imposed through the roof track system. While the entire longitudinal extent of the arcuate member 25 may be arranged for flexing action, in the presently preferred embodiment of my invention, only the inner arcuate portion 30 of the arcuate member 25 is arranged for flexing, the remaining portion of the arcuate member 25 being provided with flanges to impart rigidity thereto. Thus, the outer extent of the arcuate member 25 is provided with like downturned flanges 31 along its edges and the intermediate portion of the arcuate member 25 is provided with a pair of like upturned flanges 32 which also serve to mount the track clamping member 26. As shown in FIG. 7, the track clamping member 26 is interconnected with the upturned flanges 32 by a bolt 35 which is engaged through conforming holes provided in the upturned flanges 32 and laterally through the track clamping member 26. As thus mounted, the track clamping member 26 is arranged for limited pivotal movement about a substantially horizontal axis normal to the arcuate member 25. However, by selective tightening of the nut 36 on the bolt 35 the roof clamping member 26 may be temporarily restrained in a desired track receiving position to most easily receive the associated end portion of the roof tracks 14 and 15 while erecting the roof track system. The track clamping member 26 is also formed with a C cross section, the interior portion of which is formed to slidably receive the associated tracks 14 and 15. The open portion of the track clamping member 26, defined by edges 38 and 39 is somewhat greater than the open portion of the associated tracks 14 and 15 to freely pass the axles of the rollers of the dolly 12. A cap screw 40 is threadedly engaged through a threaded opening provided therefor in the back wall 41 of the track clamping member 26 to retainedly engage the corresponding outside wall of the associated roof tracks 14 and 15 and thereby hold the track clamping member 26 in a desired position with respect to the associated tracks 14 and 15. The strap 27 is a web-shaped member formed of a flexible material which will conformedly engage the upper surface 45 of the roof 18 without appreciable elongation. The strap 27 is formed of a durable belting material such as a plastic material which will withstand severe weather conditions without substantial loss of flexibility. As shown at FIG. 5, the strap 27 is attached at the outer ends of the arcuate member 25 by rivets 46 which are engaged through overlapped end portions of the strap 27 and the arcuate member 25. The inner end of the arcuate member 25 is curved to receive the associated inner end of the strap 27 in a smooth relationship over the entire width of the strap 27 and to avoid protuberances which might injure the roof 18. The outer end of the strap 27 is attached to the under face of the arcuate member 25 with rivets 46 and is doubled back to assure smooth contact with the upper surface 45 of the roof 18. In this way, no portion of the arcuate member 25 is in direct contact with the upper surface 45, and only the strap 27 engages the roof 18. The bracket 19 is attached at its outer end to the corresponding rain gutters 20 and 21 by a J clamp 50, and as thus attached, the flexing action of the inner portion of the arcuate member 25 is substantially unconstrained. As best seen at FIG. 5, the outer end of the arcuate member terminates in a linear edge 51 which is adapted to engage the trough of the appropriate rain gutters 20 and 21. Preferably, the edge 51 is formed with a curved cross section to avoid injury to the paint surface in the trough of the rain gutters 20 and 21. Inwardly adjacent the outer edge 51, an ear portion 52 is partially sheared from the body of the arcuate member 25 to form a nut means and is provided with a threaded opening to receive a clamping screw 53. The J member 50 includes a substantially planar upper portion 54 and a hook portion 55 at the lower end thereof. An elongated slot 56 is provided in the upper portion 54 to slidably receive the clamping screw 53 therethrough, the clamping screw 53 being used to draw the hook portion 55 into bearing engagement with the underside of the rain gutters 20 and 21 to maintain the arcuate member 25 in engagement with the rain gutters 20 and 21.

It will be appreciated that the brackets 19 will be used with vehicles which have a wide range of roof contours adjacent the rain gutters thereof. For this reason, the strap 27 is not tautly strung on the arcuate member 25, but rather in its free state is arranged with some slack. As thus arranged, the strap 27 may be brought into intimate engagement over its entire outer surface with the roof surface 45 of the vehicle with which it is used and in cases where such engagement does not take up all of the slack in the strap 27, the arcuate member 25 may be pressed toward the roof surface 45 to flex the outer portion 30 thereof and thereby draw up the slack in the strap 27. Selective pre-tensioning of the strap 27 is maintained by appropriate spacing of the track clamping members 26 on the associated roof tracks 14 and 15. I have found that the described arrangement of the strap 27 and the arcuate member 25 operates to distribute the load imposed upon the respective mounting bracket 19 uniformly over the face af the strap 27 and as a uniform pressure against the roof 18. Of course, the magnitude of the uniform pressure varies directly with the magnitude of the load, but the ability of the described apparatus to uniformly distribute the load is maintained over a wide range of loads. While an arcuate member 25 is used in the described embodiment, and is preferred for its simplicity, the strap supporting element may be constructed in numerous other forms which will operate to increase and decrease the longitudinal tension in the roof engaging strap commensurately with a corresponding increase and decrease in the load directed upon the bracket. For I have further found that the described effect is optimally obtained when the tension in the strap is sufficient to maintain the inner end 30 of the arcuate member 25 in a slightly spaced position from the roof 18. Thus, an increased load on the bracket 19, which would otherwise drive the inner end 30 of the arcuate member 25 against the roof 18, operates to commensurately increase the tension in the strap 27 as the inner end 30 is forced outwardly and thereby counteracts the downward force effect to maintain the inner end 30 in its slightly spaced position away from the roof 18. Concomitantly, it will be readily appreciated that when only the tensioned strap 27 is in engagement with the roof 18 that the outward pressure exerted thereagainst is substantially equal over the entire face of the strap 27. In this way, load on each of the brackets 19 is uniformly distributed over a substantial area of the roof 18 and the uniform distribution is maintained as the load fluctuates over a wide range.

The extension tracks 16 and 17 have a C cross sectional configuration like that of their associated roof tracks 14 and 15 respectively and include a curvilinear portion 60 and 61 adjacent their upper ends which is adapted to provide a continuous path between the inclined extension tracks 16 and 17 and the substantially horizontal roof tracks 14 and 15. The inclined extension tracks 16 and 17 are coupled to their associated roof tracks 14 and 15 respectively by couplers 62 at their upper ends. Each coupler 62 has a C cross section, the interior portion of which is arranged to slidably receive the roof tracks 14 and 15 and the extension tracks 16 and 17. The couplers 62 are fixedly attached to the upper ends of the respective extension tracks 16 and 17 as by welding along their outer edges, and are arranged so that approximately one-half of the length of the coupler 62 extends outwardly beyond the upper end of the extension tracks 16 and 17 to receive the corresponding outer ends of the roof tracks 14 and 15. Each coupler 62 is provided with a threaded opening in the back wall of the outwardly extending section thereof and a cap screw 63 is engaged therethrough to engage the back wall of the corresponding associated roof tracks 14 and 15 to maintain the mating ends of the roof tracks and their associated extension loading tracks in rigid abutting engagement.

While the dolly used with my present invention may be formed in numerous different structural arrangements to accommodate particular types of cargo, the body of dolly 12 of this embodiment of my present invention is constructed in the form of a frame 70 which is uniquely adapted to receive and bear a particular cargo, namely, boats. Thus, it will be understood that the body of the dolly of my present invention may also assume the form of a platform, a box, including a cover, or any one of a plurality of special-purpose cargo bodies. The frame 70 is formed of a pair of spaced parallel main frames 71 and 72 arranged laterally of the automobile 11, and a pair of supporting cross frames 73 and 74. The main frames 71 and 72 and the cross frames 73 and 74 are formed of mild steel channel members, and are secured together as by welding. An outwardly extending axle 73 is attached at each of the opposite ends of the cross members 73 and 74, and each mounts one of the like roller bearing wheels 76. As shown at FIG. 6, the diameter of the wheels 76 is slightly less than the height of the interior portion of the tracks, and the width of the wheel 76 is slightly less than the inside width of the interior portion of the tracks so that each wheel 76, while free to roll within the confining tracks, is restrained from movement in directions normal to the longitudinal extent of the track. As thus arranged, the dolly 12 is movable along the track system 13 between a loading and unloading position at the ground adjacent the automobile 11 and a transit position atop the roof 18 thereof. The described construction permits the dolly 12 to be anchored in its transit position by merely blocking the wheels 76 in the roof tracks 14 and 15, and it is not necessary to use external tie-downs for this purpose. While it will be understood that there are numerous means for blocking the wheels 76 from movement with respect to the roof tracks 14 and 15, in this embodiment of my invention I contemplate the use of elongated members 80 which are formed for slidable engagement within the tracks 14 and 15 and which have a length to extend from the outer peripheral surface of the associated wheel 76 to the adjacent outer end of the tracks 14 and 15. Realizing that the extension tracks 16 and 17 may be attached to the roof tracks at either side of the automobile 11, the blocks 80 may be inserted in the opposite ends of the tracks 14 and 15 to stop and center the dolly 12 with respect to the roof tracks 14 and 15. After disengaging the extension tracks 16 and 17, the remaining blocks 80 are inserted into the then open end of the roof tracks 14 and 15 and into bearing engagement with the adjacent wheels 76 of the dolly 12 to secure the dolly 12 and its cargo for transit. As shown in FIG. 8, the blocks 80 are locked in their respective positions in the roof tracks 14 and 15 by cap screws 81 which are engaged through threaded openings provided in the blocks 80 and which are selectably brought into restraining engagement with the associated back wall of the tracks 14 and 15.

The cargo, a boat 85, is mounted on the main frames 71 and 72 by directly clamping the boat at its opposite upper side edges directly to the flanges of the main frames 71 and 72 by means such as C clamps (not shown). As shown at FIG. 3, the upper flange surfaces 77 and 78 of the main frames 71 and 72 lie vertically above the upper edges of the roof tracks 14 and 15 to prevent the cargo from striking or being obstructed by the tracks as the dolly 12 is rolled along the linear portion of the track system 13. While in this embodiment the boat 85 is attached directly to the cross members of the main frame 71 and 72, it will be appreciated that the cargo may, where convenient, be attached to the cross members 73 and 74 as well.

The apparatus 10 of my present invention is easily mounted on the roof 18 of the automobile 11 in the following manner. First, the four mounting brackets 19 are placed in their approximate positions on the roof 18 without tightening the J clips 50. The associated roof tracks 14 and 15 are then slipped through the track clamping members 26 of the respective mounting brackets 19 to a position generally centrally with respect to the brackets 19 and the roof 18 of the automobile 11. A pair of the blocks 80 are slipped into the open ends of the roof tracks 14 and 15 and are securely locked with their outer ends flush with the outer end of the respective roof tracks 14 and 15 by tightening the cap screws 81. The dolly 12 is then brought to a position at which its wheels 76 will engage the roof tracks 14 and 15, and the roof tracks 14 and 15 are singly or together shifted to accommodate the wheels 76 in a free rolling relationship. The J clips 50 of the brackets 19 are then secured to the respective associated rain gutters 20 and 21 to fix the tracks 14 and 15 longitudinally with respect to the roof 18. As described hereinbefore, if all of the slack has not been taken up in the straps 27, appropriate pressure to bring the strap into full engagement with the upper surface 45 of the roof 18 is applied in a downward direction on the track clamping member 26, after which the cap screw 40 thereof is tightened to clamp the track therewithin. This latter procedure is repeated at each of the mounting brackets 19 until the roof tracks 14 and 15 are securely fixed in their associated track clamping members 26 and the roof tracks 14 and 15 are constrained laterally as well as longitudinally of the roof 18.

With the roof tracks 14 and 15 securely attached to the roof 18 of the automobile 11, the boat 85 is loaded in the following manner. The extension tracks 16 and 17 are attached in parallel spaced positions with their bottom ends resting on the ground and their upper ends firmly interconnected with the extension tracks 16 and 17 with the roof tracks 14 and 15 respectively by the couplers 62. As thus assembled, the extension tracks 16 and 17 and the roof tracks 14 and 15 form a track system 13 along which the dolly 12 is movable between a position generally centrally above the roof 18 of the automobile 11 and a loading position at the ground at the side of the automobile 11. A pair of the blocks 80 are then engaged in the opposite open ends of the roof tracks 14 and 15 and are locked in position by the associated cap screws 81 to provide a centering stop for the dolly 12. The dolly 12 then is rolled to its loading position at the ground and the boat 85 is mounted and secured thereon. With the boat 85 secured to the main frames 71 and 72, the boat and the dolly are easily rolled to the transit position against the blocks 80, the extension rails 16 and 17 removed, and the remaining blocks inserted in and locked in the now open ends of the roof tracks 14 and 15 to securely retain the dolly 12 and the boat 85 for transit.

The boat 85 is unloaded by removing the blocks 80 at the side of the automobile 11 at which it is desired to unload the boat 85, and the respective extension tracks 16 and 17 are firmly coupled to the associated roof tracks 14 and 15 at the now open ends thereof. The boat 85 and the dolly 12 are then easily rolled down the inclined extension tracks 16 and 17 to a position at the ground at the side of the automobile 11 and the means securing the boat 85 to the main frames 71 and 72 released to permit the removal of the boat 85 from the dolly 12. When the extension tracks 16 and 17 are not in use, it is a simple matter to secure these tracks to the roof tracks under the boat where they may be easily retrieved for later unloading the boat 85 from the automobile 11.

I claim:

1. Cargo carrier and loading apparatus for use with an automotive vehicle having a supportive roof, said apparatus comprising: a load bearing frame supportedly mounted on the roof of the vehicle and defining a pair of parallel spaced roof tracks; a pair of associated removable loading tracks arranged in respective registry with said roof tracks and extending from a common end thereof to the ground adjacent the vehicle, said tracks having a C cross section; a cargo dolly having wheels at its opposite sides which are supportedly engaged within said tracks in a guided relationship and which are movable continuously therelong, said cargo dolly being movable between positions adjacent the ground and generally centrally of said roof, and block means constraining said wheels from movement along said tracks when said dolly is in its position generally centrally of said roof, said block means comprising four like bar members having a cross sectional configuration adapted for slidable engagement within said tracks and having a length to extend from the outermost wheel of said cargo dolly to the terminal end of the roof tracks adjacent thereto, and means for locking each of said bar members with respect to said tracks.

2. Cargo carrier and loading apparatus for use with an automotive vehicle having a supportive roof, said apparatus comprising: a load bearing frame defining a pair of parallel spaced roof tracks, said roof tracks being supported by associated brackets which bear against and are substantially supported by the roof of the vehicle, two of said brackets being associated with each track of said pair of tracks and being arranged in positions respectively adjacent the opposite edges of the roof of the vehicle to support said track therebetween, each bracket comprising an upwardly curved bow member having track receiving and clamping means intermediate the opposite ends thereof, a flexible strap strung between the opposite ends of said bow member and being so arranged that substantially all of the outer surface thereof conformedly engages the roof of the vehicle, and means anchoring the outer end of said bow member to the adjacent edge of the vehicle roof; a pair of associated removable loading tracks arranged in respective registry with said roof tracks and extending inclinedly from a common end thereof to the ground adjacent the vehicle; a cargo dolly having wheels at its opposite sides which are supportedly engaged within said tracks in a guided relationship and which are movable continuously therelong, said cargo dolly being movable between positions adjacent the ground and generally centrally of said roof, and block means constraining said wheels from movement along said tracks when said dolly is in its position generally centrally of said roof.

3. The invention set forth in claim 2 wherein said bow member is formed of a spring metal, and said strap has an extended length less than that of said bow member, whereby when a load is imposed upon said bracket through said load bearing frame said opposite ends of said spring member are urged apart thereby subjecting said strap to a corresponding increased tension to ratably distribute the imposed load equally over the outer surface of said strap and against the roof of the vehicle.

4. The invention set forth in claim 3 wherein said track receiving and clamping means is arranged for limited pivotal movement with respect to said bow member and about a lateral axis whereby said bracket will receive the associated track when used on vehicles having different roof configurations adjacent the edges thereof.

5. The invention set forth in claim 4 wherein the vehicles with which said brackets are used have rain gutters along the opposite edges of the roof thereof and said means anchoring the outer end of said bow member is arranged for removable attachment thereto.

6. The invention set forth in claim 5 wherein the outer end of said strap is attached to the associated bow member inwardly adjacent the outer end thereof, said outer end of said bow member being arranged for insertion in the valley of said gutter, and a clip having a J-configuration adjustably attached to said bow member adjacent the outer end thereof, the hook portion of said clip extending outwardly beyond said outer edge of said bow member to engage the underside of the gutter.

7. The invention set forth in claim 2 wherein the portion of said bow member extending outwardly from said track receiving and clamping means is substantially rigid, and the portion extending inwardly to the inner end of said bow member is deflectable.

8. A mounting bracket for supporting the beam member of a cargo carrier above the roof of a vehicle, said bracket comprising: a bowed member formed of a spring material and arranged for limited flexing movement; a flexible non-elongatable strap strung upon said bowed member and having a length less than the developed length of said bowed member; means for attaching the beam member generally centrally of said bowed member, and means at one end of said bowed member for anchoring said one end to the outer edge of the vehicle roof, whereby when a load is imposed upon said bowed member from the carrier the outer ends of said bowed member are urged apart producing a proportional increase in the tension in said strap thereby maintaining a uniform distribution of the load over the face of the strap and against the roof of the vehicle.

9. A cargo supporting structure comprising an elongated rigid beam member and a pair of mounting brackets cooperatively engaged adjacent the respective opposite ends of said beam member and arranged for bearing engagement with the roof of the vehicle to support the load borne by the carrier, each said bracket comprising a bowed member, a flexible non-elongatable strap strung upon said bowed member and having a length less than the developed length of said bowed member, means for removably interconnecting said bowed member and said beam member, and means at the outer end of said bowed member for anchoring said outer end to the outer edge of said vehicle roof.

10. The invention set forth in claim 9 wherein said means for interconnecting said bowed member and said beam member comprises clamp means pivotally mounted to said bowed member generally centrally thereof and arranged to slidably receive said beam member, said clamping means including means for selectably locking said beam member thereto.

References Cited

UNITED STATES PATENTS

| 2,634,034 | 4/1953 | Heck. | |
| 2,765,940 | 10/1956 | Nelson | 214—450 |
| 2,849,135 | 8/1958 | Embler | 214—450 |
| 3,215,295 | 11/1965 | Schuyler | 214—450 |

HUGO O. SCHULZ, *Primary Examiner.*

U.S. Cl. X.R.

224—42.